United States Patent
Cheng et al.

(10) Patent No.: US 6,286,755 B1
(45) Date of Patent: Sep. 11, 2001

(54) COIN RETRIEVAL DEVICE FOR A PAY PHONE

(76) Inventors: Li-Der Cheng, 6F, No. 8, Lane 82, Sec. 7, Chung Shan N. Road, Taipei; Yi-Rong Lee, 7F, No. 382, Hsin FEng Street, Keelung, both of (TW)

( * ) Notice: Subject to any disclaimer, the term of this patent is extended or adjusted under 35 U.S.C. 154(b) by 0 days.

(21) Appl. No.: 09/557,115

(22) Filed: Apr. 24, 2000

(51) Int. Cl.⁷ .................................................. B65G 11/04
(52) U.S. Cl. .......................... 232/57.5; 232/58; 379/145; 194/351
(58) Field of Search .............................. 232/57.5, 55, 57, 232/58, 15, 16; 379/143, 145, 146; 194/202, 350, 351

(56) References Cited

U.S. PATENT DOCUMENTS

| | | | |
|---|---|---|---|
| 5,018,193 | * | 5/1991 | DeArkland ........................... 379/145 |
| 5,483,583 | * | 1/1996 | Chen .................................... 379/146 |
| 5,704,463 | * | 1/1998 | Morales ........................... 194/351 X |
| 5,871,076 | * | 2/1999 | Anello et al. ..................... 379/145 X |
| 6,031,901 | * | 2/2000 | Su ....................................... 379/143 |
| 6,076,650 | * | 6/2000 | Schwarzli ......................... 194/351 X |

* cited by examiner

Primary Examiner—B. Dayoan
Assistant Examiner—William L. Miller

(57) ABSTRACT

A coin retrieval device for a pay phone includes a panel having a shaft with a retrieval lever extending radially therefrom. A guide device is pivotably connected to the panel about two pins on two ends of the guide device. The guide device includes a guide plate and a jam plate pivotably connected to the end plate of the guide plate. A gap is defined between the guide plate and the jam plate for coins passing therethrough via a coin slot defined through the guide plate. One of the two pins has a torsion spring mounted thereto which has two ends respectively connected to the retrieval lever and the guide plate. The guide device can be pivoted relative to the panel by lifting the retrieval lever, and a distal end of the jam plate is pivoted toward the coin slot to prevent coins from being inserted into the coin slot.

5 Claims, 8 Drawing Sheets

COIN RETRIEVAL DEVICE FOR A PAY PHONE

FIELD OF THE INVENTION

The present invention relates to a coin retrieval device for a pay phone, which has a retrieval lever to open the jammed passage to allow the coin drop and the user can access the coin.

BACKGROUND OF THE INVENTION

A conventional pay phone or a game machine generally includes a coin box with a coin slot for users inserting coins in the coin slot to actuate pre-determined device of the machine. A passage is connected to the slot and leads the coin to a distinguish device which is located below the passage and distinguishes the coin according to its weight or size. When the passage is jammed by an object that is larger than the passage or cannot fit the size of the passage, the passage is jammed and no coin can reach the distinguish device. However, the users do not have any idea about the jam in the passage and another coin is inserted into the slot. Because the passage is stocked by the object so that the coin cannot drop into the coin-return assembly. It the object is stocked at a deep position of the passage, there will be many users insert their coins into the slot and cannot take them back. Besides, the passage usually is a straight passage that makes the coin drop at a relative high speed and the coin could enter the coin-return assembly directly, thereby failing to properly actuate the machine.

The present invention intends to provide a coin retrieval device that has a retrieval lever connected with a jam plate which will close the coin slot when pulling the retrieval lever. Therefore, no coin can be inserted into the coin slot.

SUMMARY OF THE INVENTION

In accordance with one aspect of the present invention, there is provided a coin retrieval device for a pay phone and comprising a panel having a retrieval lever pivotably connected thereto. A guide means is pivotably connected to the panel and includes a guide plate having an end plate extending laterally therefrom and a jam plate pivotably connected to the end plate of the guide plate. A gap is defined between the guide plate and the jam plate. A coin slot is defined through the guide plate and communicates with the passage. A torsion spring is mounted to one of two pivotal pins of the guide means. One end of the second torsion spring is connected to the retrieval lever and the other end of the second torsion spring is connected to the guide plate so that the guide means is pivoted relative to the panel by lifting the retrieval lever. A distal end of the jam plate is pivoted toward the coin slot when the jam plate is pivoted relative to the guide plate so as to prevent from any coin inserted in the coin slot.

The object of the present invention is to provide a coin retrieval device that automatically closes the coin slot when the passage is jammed by an object.

Another object of the present invention is to provide a coin retrieval device that allows the user to retrieve the coin by lifting a retrieval lever of the device.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENT

Figure 1:
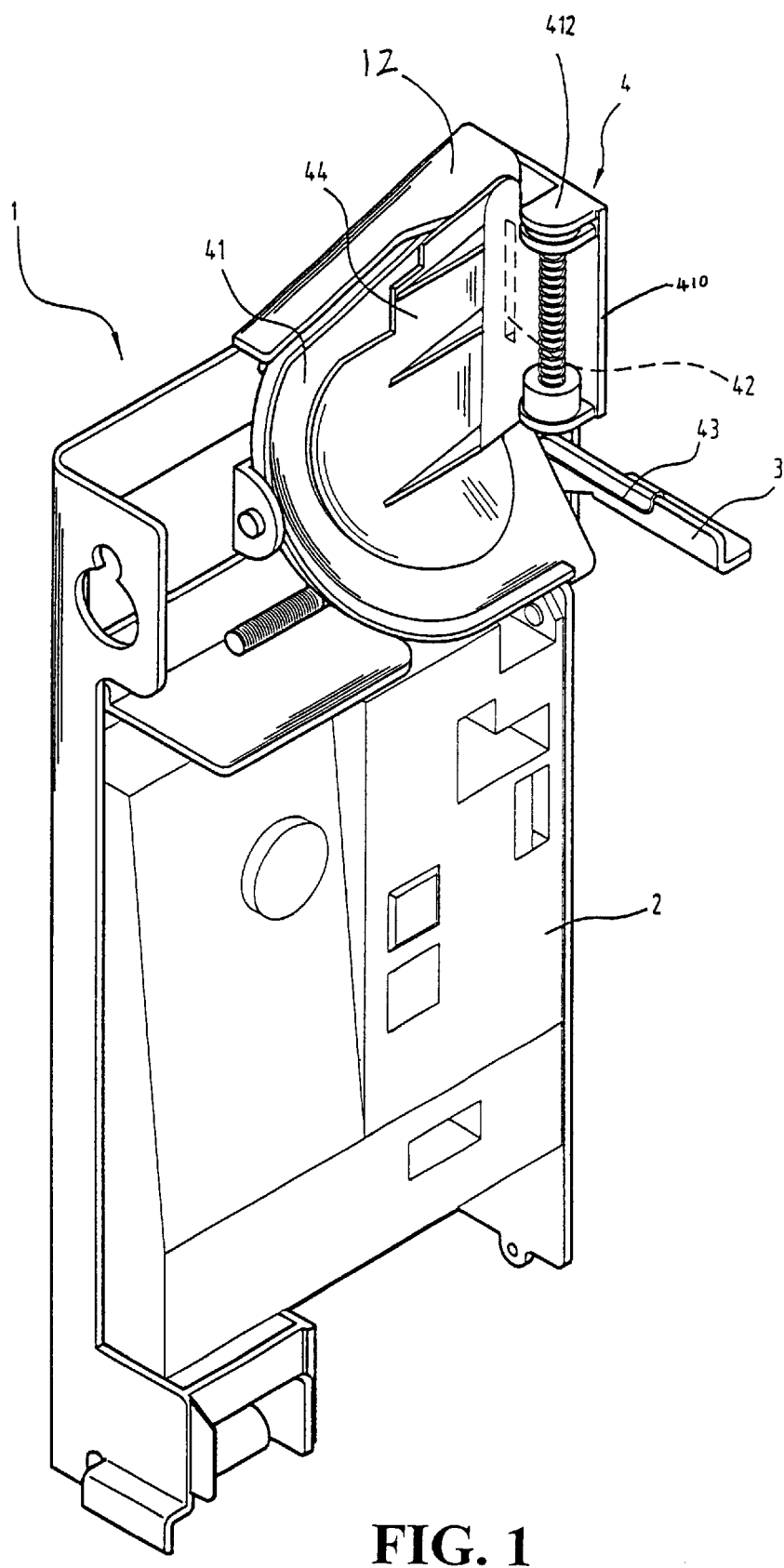
FIG. 1 is a perspective view to show the coin retrieval device of the present invention.
Figure 3:
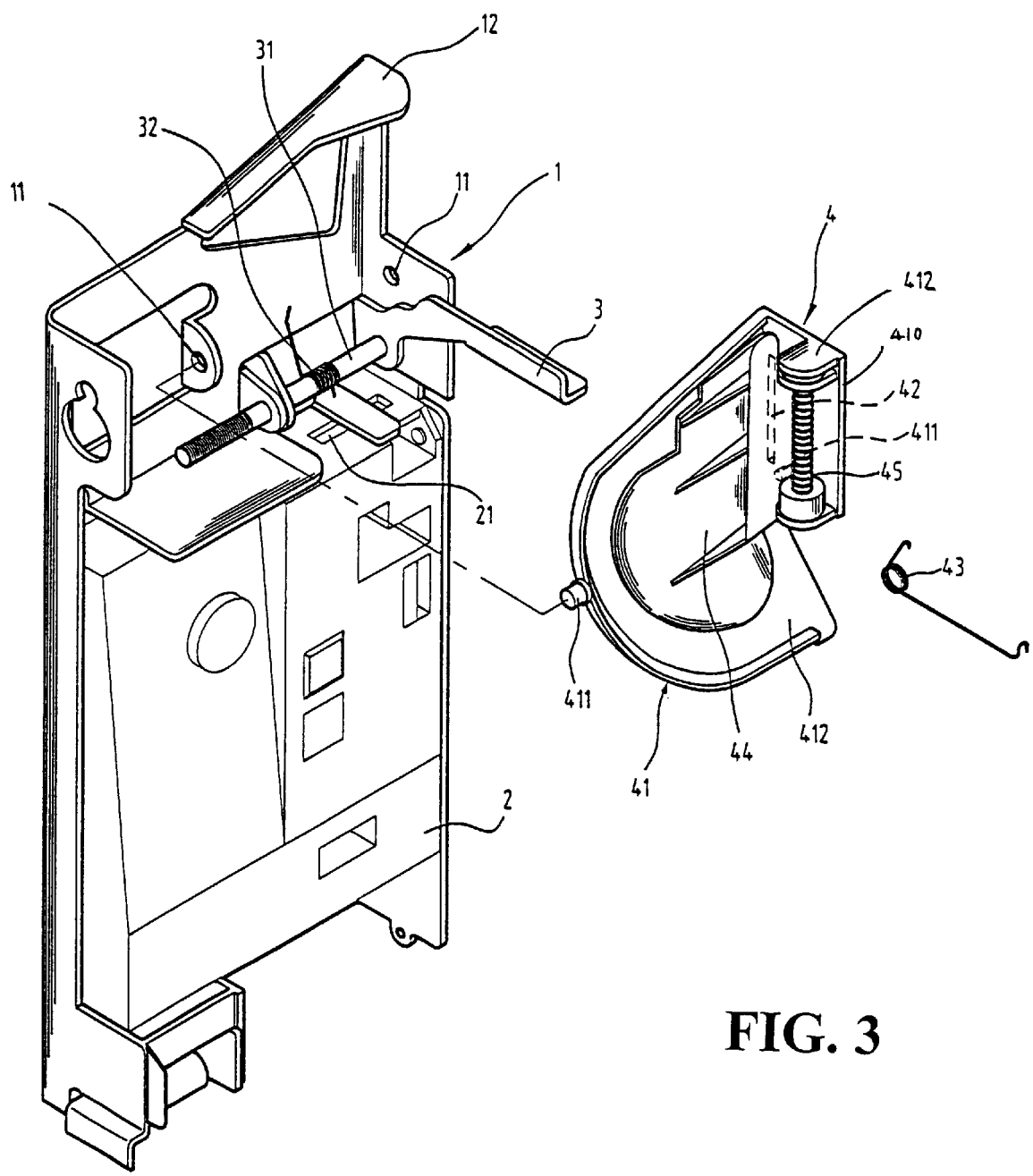
FIG. 3 is an exploded view to show the coin retrieval device of the present invention.
Figure 4:
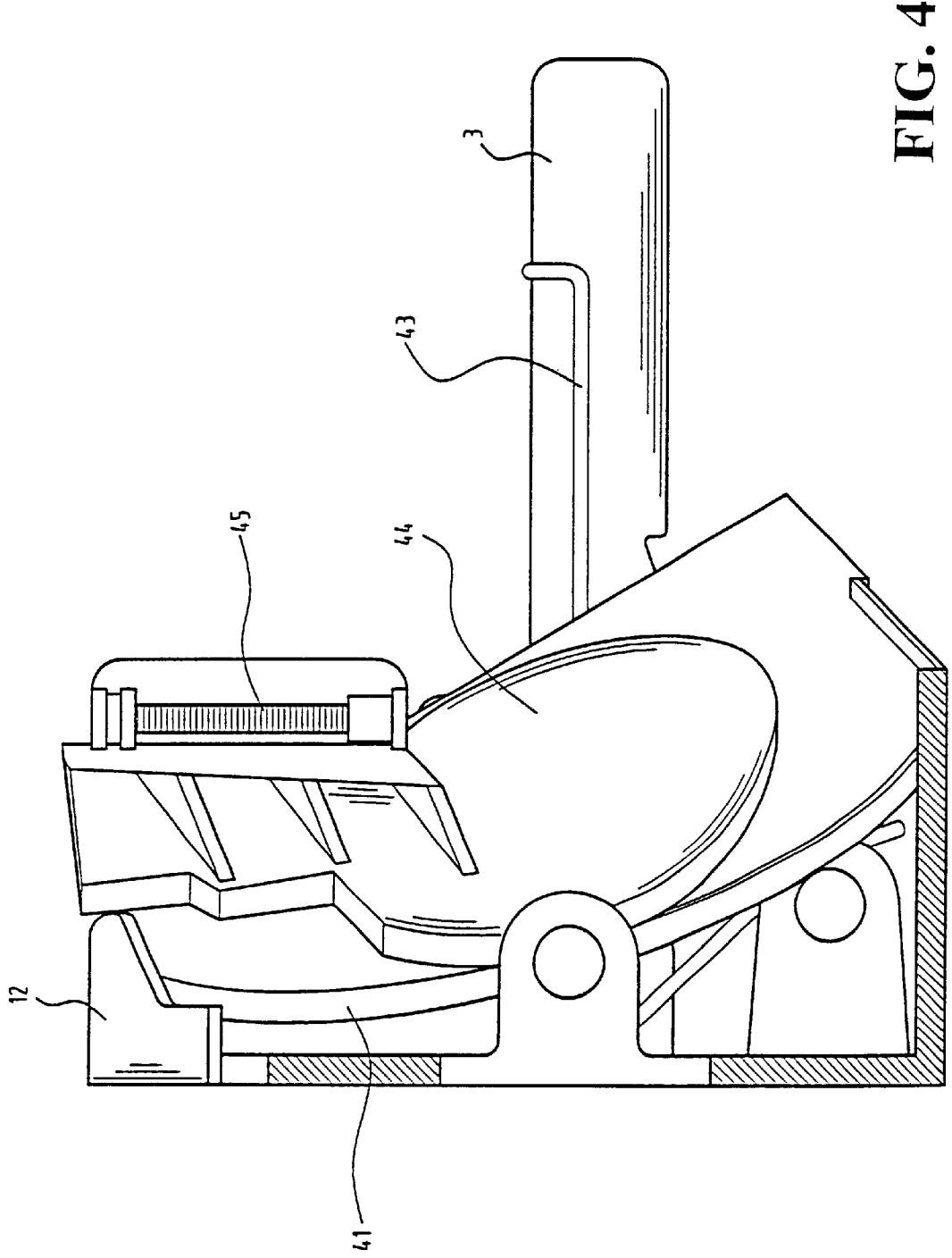
FIG. 4 is a side view to show the coin retrieval device of the present invention.

Referring to FIGS. 1, 3 and 4, the coin retrieval device for a pay phone in accordance with the present invention comprises a panel 1 which has a guide means 4 connected to a top thereof and a distinguish device 2 is connected to the panel 1 and located below the guide means 4. A shaft 31 is rotatably connected to the panel between two side lugs and a first torsion spring 32 is mounted to the shaft 31. A retrieval lever 3 is mounted to the shaft 31 and extends radially from the shaft 31. The first torsion spring 32 maintains the retrieval lever 3 to be located in a horizontal position as shown in FIGS. 1 and 3. A limit bar 12 is located on a top of the panel 1.

Figure 5:
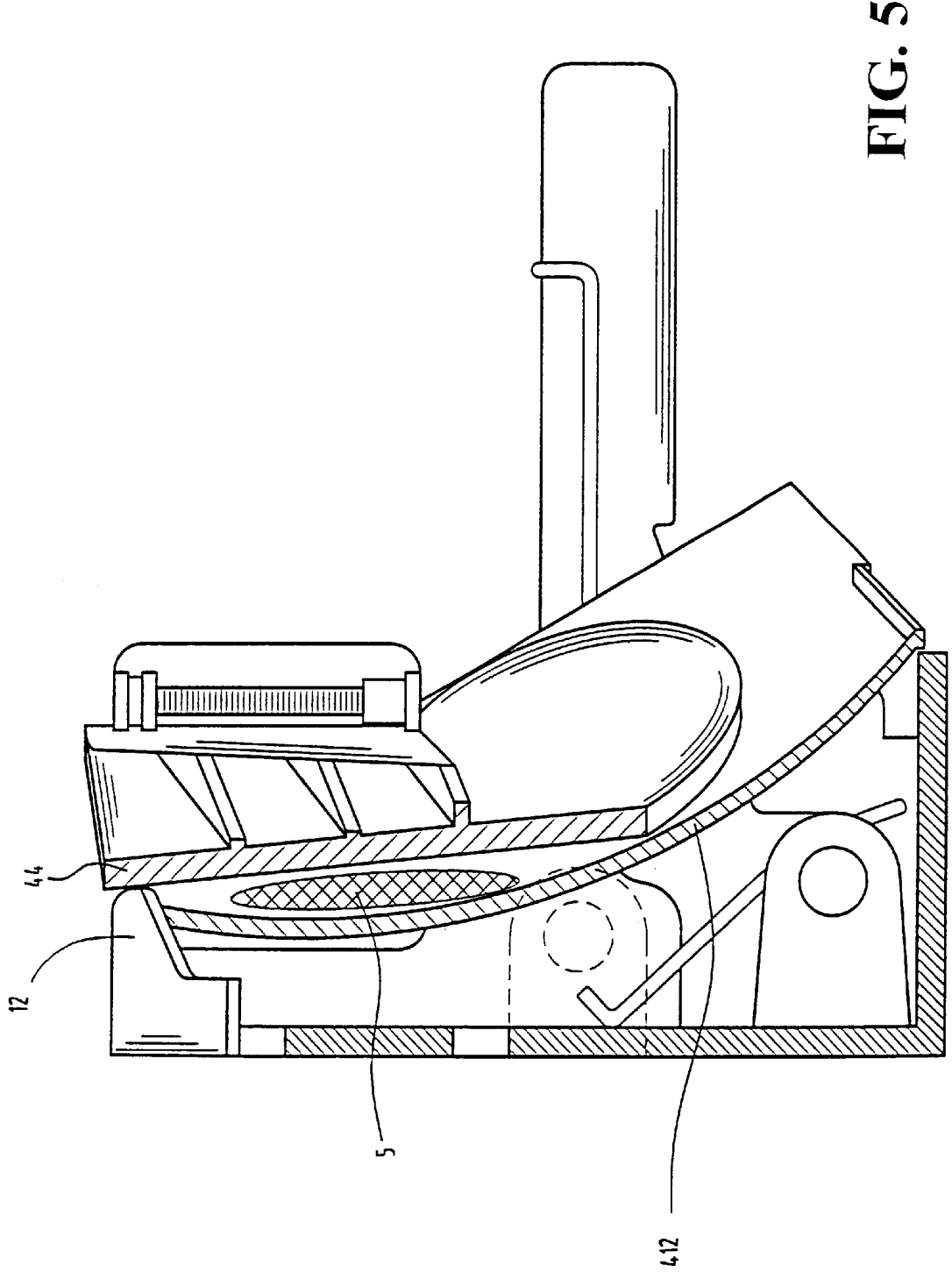
FIG. 5 is a side view to show a coin is located in the passage of coin retrieval device of the present invention.

The guide means 4 is pivotably connected to the panel 1 by respectively extending two pins 411 on two ends of the guide means 4 into two holes 11 on two lugs on the panel 1. The guide means 4 includes a guide plate 41 having an end plate 410 extending laterally therefrom and a jam plate 44 which is pivotably connected to the end plate 410 of the guide plate 41. The end plate 410 has two lugs 412 and the jam plate 44 is pivotably connected between the two lugs 412 by a spring hinge 45 so that the jam plate 44 is biased toward the guide plate 41. As shown in FIG. 5, a gap is defined between the guide plate 41 and the jam plate 44. A coin slot 42 is defined through the guide plate 41 and the gap communicates with the coin slot 42 so that a coin 5 as shown in FIG. 5 enters the gap via the coin slot 42 and drop in the distinguish device 2. One of the two pins 411 has a second torsion spring 43 mounted thereto, one end of the second torsion spring 43 connected to the retrieval lever 3 and the other end of the second torsion spring 43 connected to the guide plate 41. Referring to FIG. 5 again, a top side of the jam plate 44 contacts the limit bar 12 and the guide plate 41 has a curved portion 412.

Figure 7:
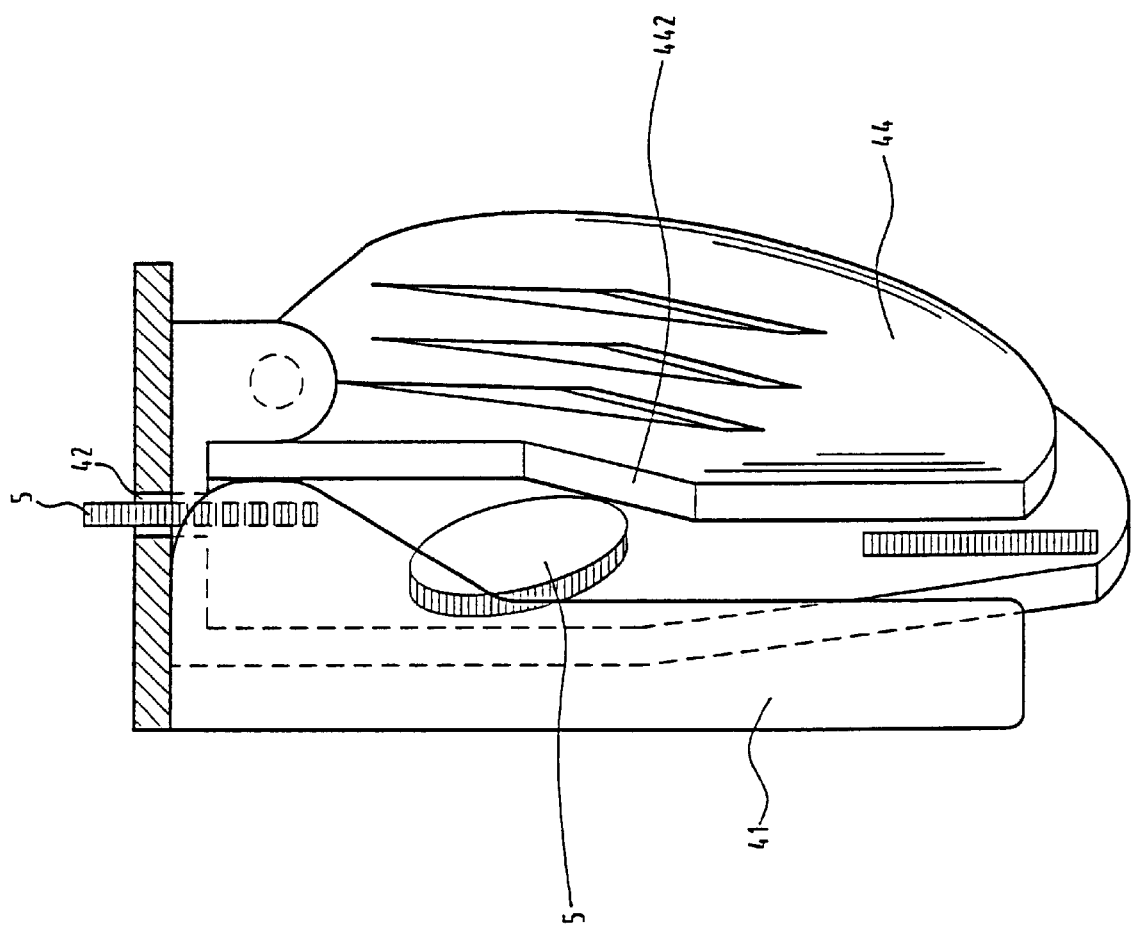
FIG. 7 shows that coins hit an inclined surface of the jam plate and drop along the curved guide plate.

As shown in FIG. 7, the jam plate 44 has an inclined surface 442 connecting the distal end 441 and the inclined surface 442 located in alignment with the coin slot 42 so that when the coin 5 is inserted into the coin slot 42, it hits the inclined surface 442 and the speed of the coin 5 is reduced so that the coin 5 is lead into the distinguish device 2 along the curved portion 412 of the guide plate 41.

Figure 8:
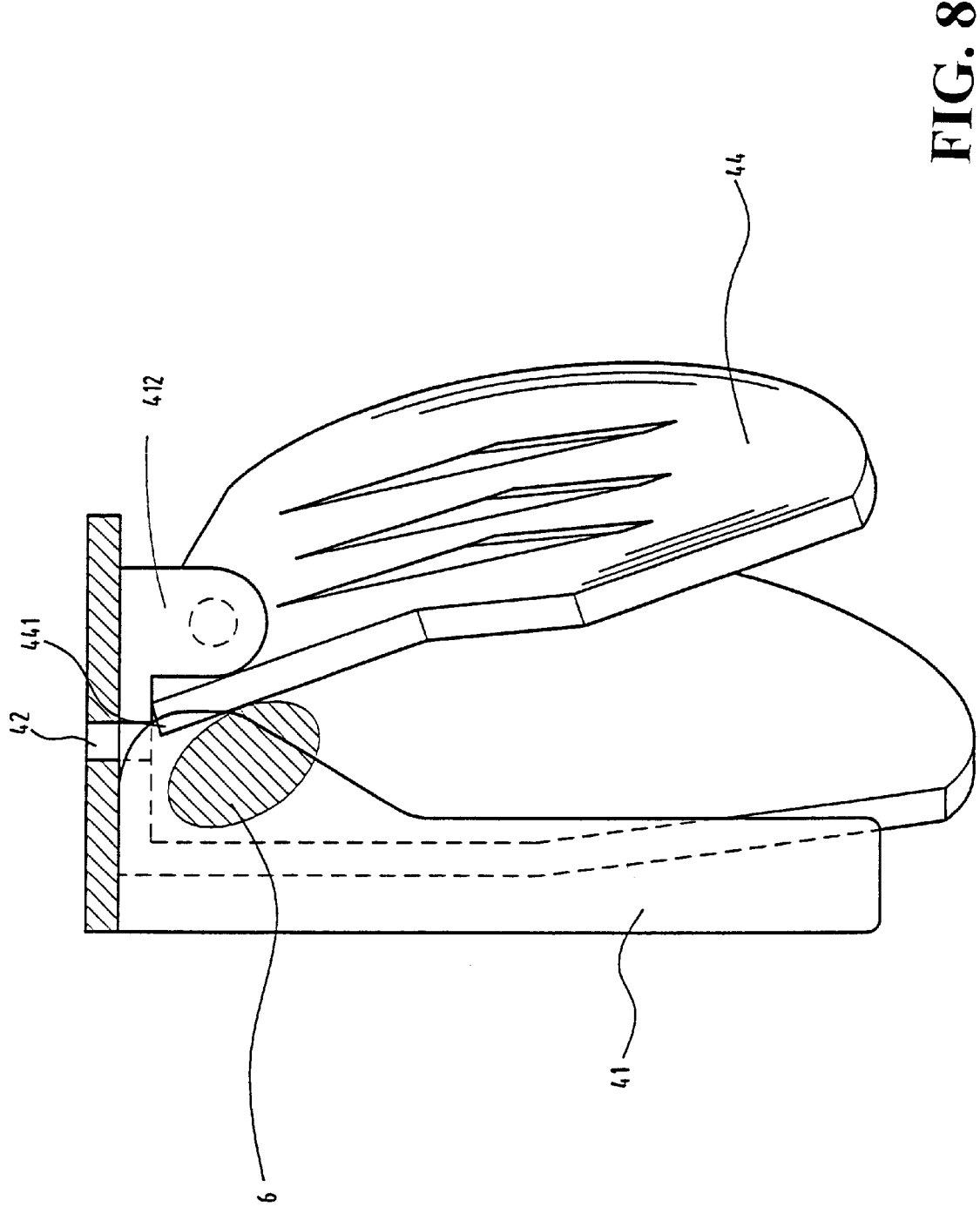
FIG. 8 is a side view to show that the jam plate is pivoted by an object in the passage of the coin retrieval device, and one end of the jam plate is moved toward the coin slot.

As shown in FIG. 8, when a larger object 6 is inserted into the coin slot 42 and jammed in the gap between the guide plate 41 and the jam plate 44. The object 6 will push the jam plate 44 which is then pivoted relative to the guide plate 41. A distal end 441 of the jam plate 44 is shifted toward the coin slot 42 and prevents the next coin from inserting into the coin slot 42. In other words, the users who do not know the pay phone is jammed cannot insert a coin in the coin slot 42.

Figure 2:
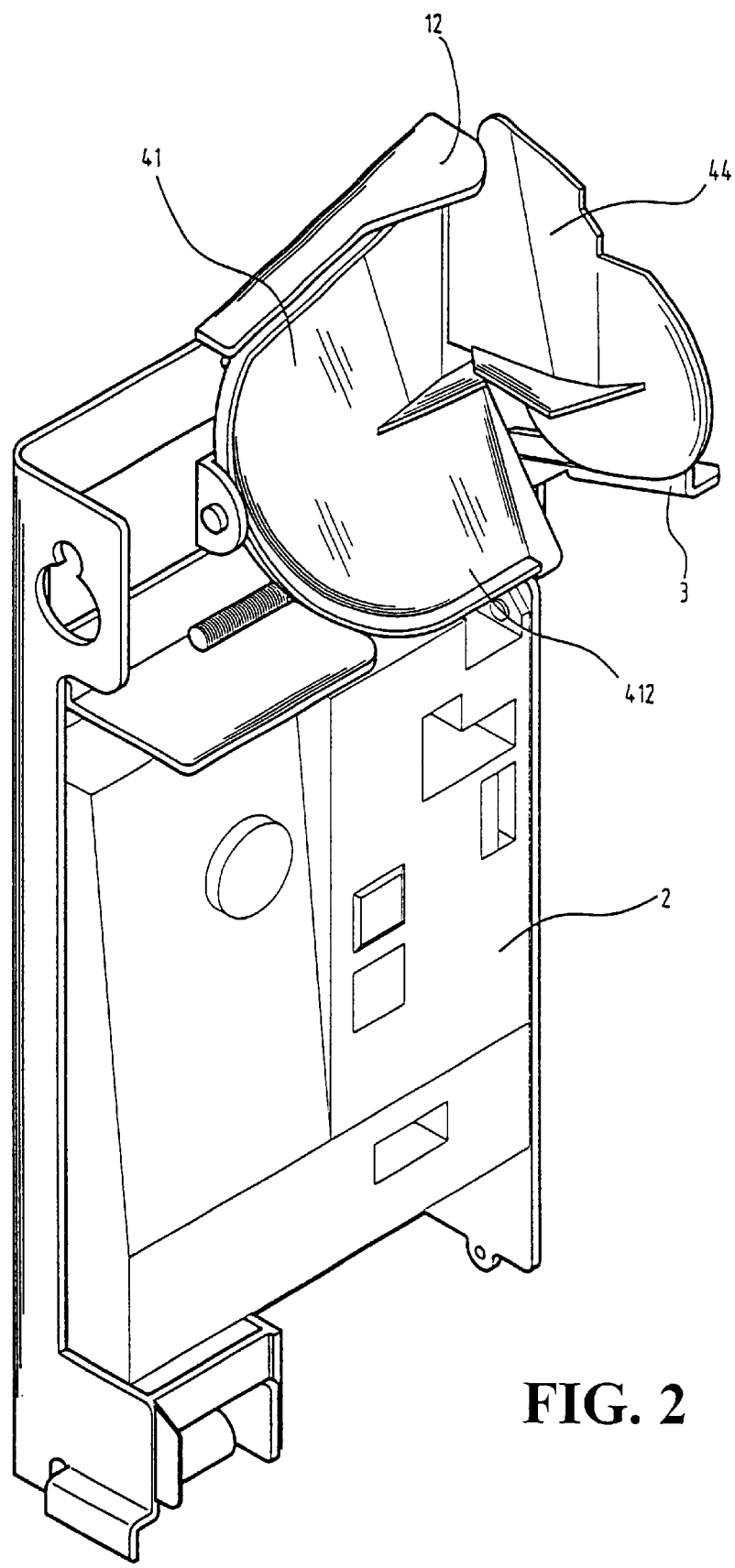
FIG. 2 is a perspective view to show the coin retrieval device of the present invention, wherein the jam plate is pivoted to close the coin slot.
Figure 6:
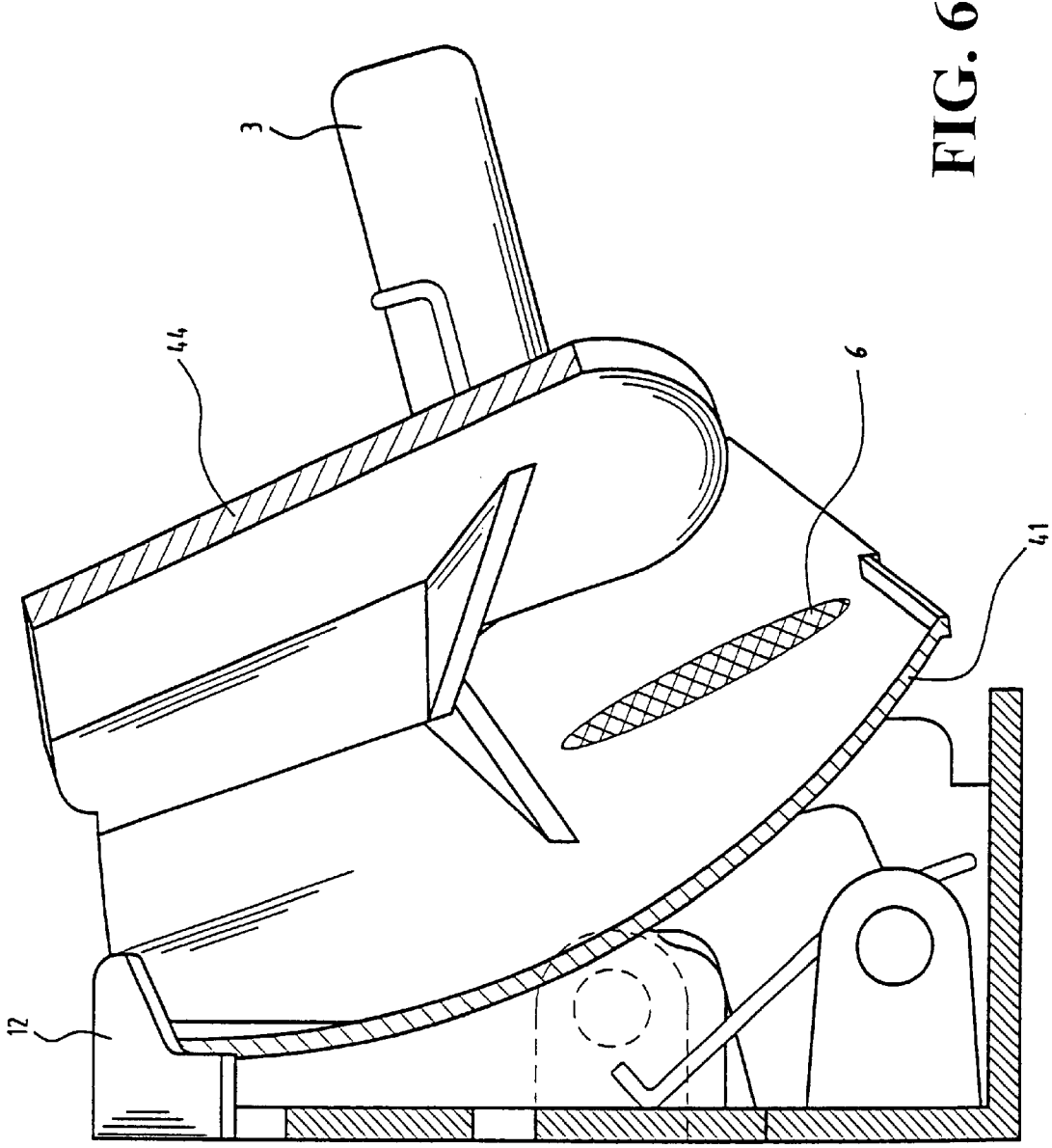
FIG. 6 is a side view to show the coin retrieval device of the present invention, wherein the guide means of the present invention is pivoted about the panel when lifting the retrieval lever.

As shown in FIGS. 2 and 6, the users may lift the retrieval lever 3 to let the guide means 4 be pivoted about the two pins 411. Because the top side of the jam plate 44 contacts the top bar 12 so that when the guide means 4 is pivoted, the larger angle the guide means 4 is pivoted, the wider the jam plate 44 is away from the guide plate 41. Therefore, the object 6 may drop from the lower end between the guide plate 41 and the jam plate 44.

Accordingly, the coin retrieval device of the present invention is equipped with a retrieval lever 3 to let the object jammed in the device drop so as to easily resolve the jam problems. The retrieval device also effectively prevents the users to insert coins into the coin slot 42 when the object 6 is jammed in the device.

While we have shown and described various embodiments in accordance with the present invention, it should be clear to those skilled in the art that further embodiments may be made without departing from the scope and spirit of the present invention.

What is claimed is:

1. A coin retrieval device for a pay phone, comprising:

a panel having a retrieval lever pivotably connected thereto, and a guide means pivotably connected to said panel about two pins on two ends of said guide means, said guide means including a guide plate having an end plate extending laterally therefrom and a jam plate which is pivotably connected to said end plate of said guide plate, a gap defined between said guide plate and said jam plate, a coin slot defined through said guide plate and said gap communicating with said coin slot, one of said two pins having a second torsion spring mounted thereto, one end of said second torsion spring connected to said retrieval lever and the other end of said second torsion spring connected to said guide plate so that said guide means is pivoted relative to said panel by lifting said retrieval lever, a distal end of said jam plate being pivoted toward said coin slot when said jam plate is pivoted relative to said guide plate.

2. The coin retrieval device as claimed in claim 1 further comprising a limit bar on a top of said panel whereby a top side of said jam plate contacts said limit bar.

3. The coin retrieval device as claimed in claim 1, wherein said end plate has two lugs and said jam plate is pivotably connected between said two lugs by a spring hinge.

4. The coin retrieval device as claimed in claim 1, wherein said guide plate has a curved portion.

5. The coin retrieval device as claimed in claim 1, wherein said jam plate has an inclined surface connected to said distal end, and said inclined surface located in alignment with said coin slot.

* * * * *